US012632866B2

(12) United States Patent
Kulasekaran et al.

(10) Patent No.: US 12,632,866 B2
(45) Date of Patent: May 19, 2026

(54) COMPUTERIZED-METHOD FOR IDENTIFYING SYNTHETIC IDENTITY FRAUD OPERATING A FINANCIAL-ACTIVITY IN A DIGITAL FINANCIAL ACCOUNT, IN A FINANCIAL INSTITUTION

(71) Applicant: Actimize LTD., Ra'anana (IL)

(72) Inventors: Uma Shankar Kulasekaran, Alpharetta, GA (US); Danny Butvinik, Haifa (IL); Kushal Edwankar, Pune (IN)

(73) Assignee: NICE LTD, Ra'anana (IL)

( * ) Notice: Subject to any disclaimer, the term of this patent is extended or adjusted under 35 U.S.C. 154(b) by 156 days.

(21) Appl. No.: 18/095,018

(22) Filed: Jan. 10, 2023

(65) Prior Publication Data
US 2024/0232892 A1 Jul. 11, 2024

(51) Int. Cl.
*G06Q 20/40* (2012.01)
*G06Q 20/38* (2012.01)

(52) U.S. Cl.
CPC ....... *G06Q 20/4016* (2013.01); *G06Q 20/382* (2013.01)

(58) Field of Classification Search
CPC ................................................. G06Q 20/4016
See application file for complete search history.

(56) References Cited

U.S. PATENT DOCUMENTS

2019/0164173 A1* 5/2019 Liu ........................ G06N 20/00
2021/0241120 A1* 8/2021 Chen .................. G06Q 30/0185

* cited by examiner

*Primary Examiner* — Edward Chang
(74) *Attorney, Agent, or Firm* — SOROKER AGMON NORDMAN RIBA

(57) ABSTRACT

A computerized-method for identifying synthetic identity fraud operating a financial-activity in a digital financial account, in a Financial Institution (FI), is provided herein. The computerized-method includes building a Machine Learning (ML) model and then implementing the ML model and a synthetic identity identification module in an FI system to evaluate if a financial-activity operated through each account is having a synthetic identity behaviour or a genuine behavior. When a financial-activity is operated through an account, sending the financial-activity to the synthetic identity identification module and operating the synthetic identity identification module and the ML model to provide a calculated synthetic identity fraud score and when the calculated synthetic identity fraud score is above a preconfigured threshold, the financial activity is alerted and the synthetic identity fraud score is sent to an analyst that investigates the financial activity.

6 Claims, 15 Drawing Sheets

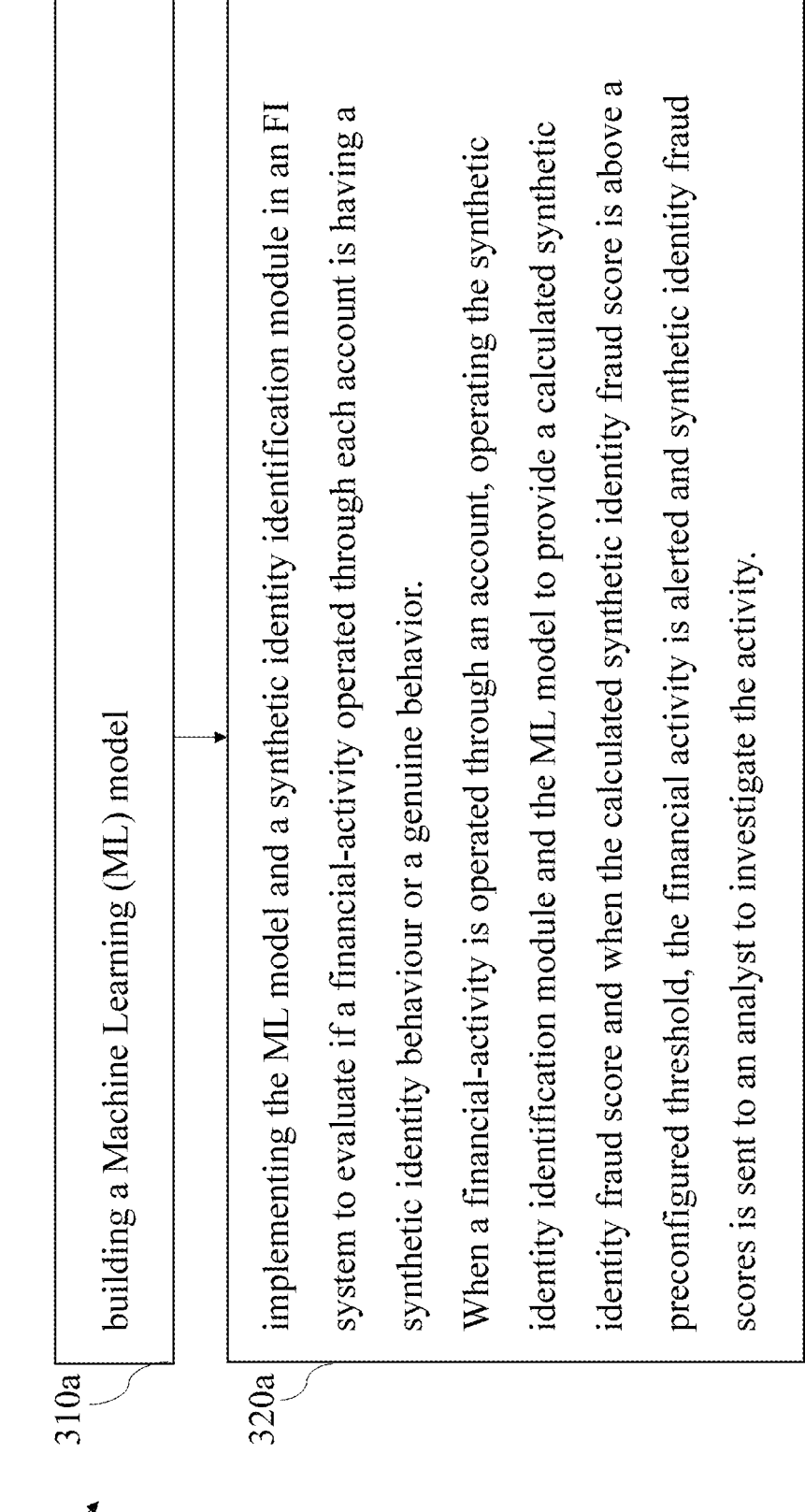

300A

310a building a Machine Learning (ML) model

320a implementing the ML model and a synthetic identity identification module in an FI system to evaluate if a financial-activity operated through each account is having a synthetic identity behaviour or a genuine behavior.

When a financial-activity is operated through an account, operating the synthetic identity identification module and the ML model to provide a calculated synthetic identity fraud score and when the calculated synthetic identity fraud score is above a preconfigured threshold, the financial activity is alerted and synthetic identity fraud scores is sent to an analyst to investigate the activity.

Figure 3A

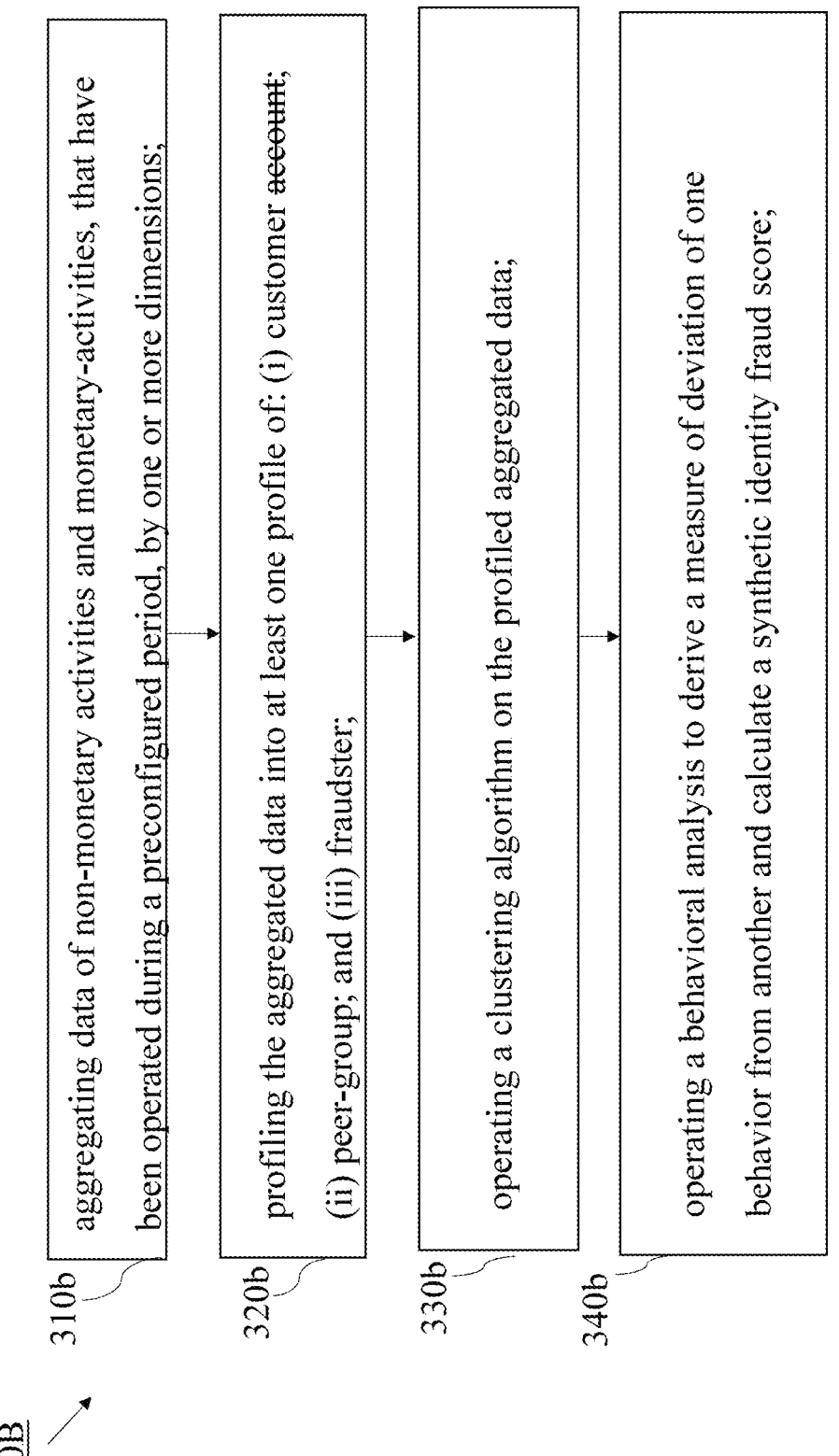

300B

310b — aggregating data of non-monetary activities and monetary-activities, that have been operated during a preconfigured period, by one or more dimensions;

320b — profiling the aggregated data into at least one profile of: (i) customer account; (ii) peer-group; and (iii) fraudster;

330b — operating a clustering algorithm on the profiled aggregated data;

340b — operating a behavioral analysis to derive a measure of deviation of one behavior from another and calculate a synthetic identity fraud score;

| Impact | Party Profile | Peer/Fraud Profile Aggregator |
|---|---|---|
| 1 | No. of distinct transaction types | mean, median, count |
| 2 | No. of payees | mean, median, max |
| 3 | No. of daily logins | mean, median, max |
| 4 | Time difference b/w payee setup & monetary transfer | mean, max |
| 5 | No. of devices | mean, median, max |
| 6 | No. of enrollment activities | mean, median, max |
| 7 | No. of payors | mean, median, max |
| 8 | Time difference b/w login and payment in same session | mean, max, min |
| 9 | Median account available balance | median |
| 10 | Ratio of current money-in and money-out trxs in last 7 days | mean, max, min |
| 11 | Ratio of last money-in and money-out trxs in last 7 days | mean, max, min |
| 12 | On-us payee account age | mean, max |

COMPUTERIZED-METHOD FOR IDENTIFYING SYNTHETIC IDENTITY FRAUD OPERATING A FINANCIAL-ACTIVITY IN A DIGITAL FINANCIAL ACCOUNT, IN A FINANCIAL INSTITUTION

TECHNICAL FIELD

The present disclosure relates to the field of supervised and unsupervised machine learning, statistics, multivariate statistics and Artificial Intelligence (AI).

BACKGROUND

Financial Institutions (FI)s or banks are business organizations which provide services to facilitate financial and monetary transactions. Monetary transactions are initiated by FI's customers to transfer money to or receive money from individuals or organizations. Digital transformation or digitalization of services to provide better customer service at reduced cost has been the key initiative for FIs during the last couple of years.

Since the global pandemic of 2020-2021, there is an ongoing growth in digital capabilities to provide service to customers to perform their banking operations, without physically visiting a branch, due to regulations regarding quarantine and other public health matters. Indeed, remote digital account handling has many advantages, such as decreasing on-boarding cost, expanding the footprint of FIs to increase customer acquisition, and generating revenue growth.

However, remote digital account opening also incurs challenges of fraud risk prevention and detection, such as identifying a new customer based on details provided via a new account online application. Taking advantage of the digital channel, a fraudster may apply for new accounts online by creating synthetic identities. The synthetic identities may be created by combining real and fake information to create a new identity or using a stolen social security number with other fake details or creating an identity without a real Personal Identifiable Information (PII). Also, the footprints which are left on the web, through social media, public forums and the like, can all be pieced together to potentially impersonate or create a fake identity.

Current technical solutions focus on fraud detection and prevention based upon matured profiles created based upon customers account activity. These profiles of customer behaviour usually take between six to nine months to mature, for a newly opened account. Fraudsters take advantage of the time duration between new account on first day until six months, which is the period that FIs do not have much information about the account and its behavioral patterns and open fraudulent accounts with synthetic identities.

Other technical solutions which focus on detecting synthetic identity for newly opened accounts are checking how information is provided to identify a suspicious behaviour. For example, typing speed or keystrokes, advanced shortcuts usage, swipe patterns, mouse movements, every click of mouse, how the phone is held and the like. However, none of the technical solutions accurately monitor newly opened bank accounts behaviour, e.g., actions performed on one or more customer accounts, to detect a synthetic identity.

Therefore, there is a need for a technical solution for applying financial crime domain knowledge into ML approach to efficiently handle fraud issues by representing fraud detection through translation of monetary and non-monetary actions or events into behavioral patterns.

SUMMARY

There is thus provided, in accordance with some embodiments of the present disclosure, a computerized-method for identifying synthetic identity fraud operating a financial-activity in a digital financial account, in a Financial Institution (FI).

In accordance with some embodiments of the present disclosure, the computerized-method includes: (i) building a Machine Learning (ML) model by: a. aggregating data of non-monetary activities and monetary-activities, that have been operated during a preconfigured period, by one or more dimensions; b. profiling the aggregated data into at least one profile of: (1) customer; (2) peer-group; and (3) fraudster; c. operating a clustering algorithm on the profiled aggregated data; and d. operating a behavioral analysis to derive a measure of deviation of one behaviour from another and calculate a synthetic identity fraud score; The features which are derived from behavior of individual vs fraudsters come together into the ML model for optimization. This result of the optimization is the score which can identify synthetic id's. The deviation of one behavior from another has to be related/connected to the distance from the extracted one or more dimensions from the received financial-activity to one or more dimensions in a peer-group profile and one or more dimensions in a fraudster profile as well as one or more dimensions within customer profile; (ii) implementing the ML model and a synthetic identity identification module in an FI system to evaluate if a financial-activity operated through each account is having a synthetic identity behaviour or a genuine behavior. When a financial-activity is operated through an account, sending the financial-activity to the synthetic identity identification module and operating the synthetic identity identification module and the ML model to provide a calculated synthetic identity fraud score and when the calculated synthetic identity fraud score is above a preconfigured threshold, the ML model may send the synthetic identity fraud score to an analyst that investigates the financial-activity.

Furthermore, in accordance with some embodiments of the present disclosure, the profiling of the aggregated data into the profile of customer may be for each account of customers of the FI.

Furthermore, in accordance with some embodiments of the present disclosure, the profiling of the aggregated data into the profile of peer-group may be an average of the one or more dismissions of all accounts in the FI.

Furthermore, in accordance with some embodiments of the present disclosure, the FI system may block an account, when the synthetic identity fraud score is above the preconfigured threshold. When an account is blocked any activity thereon is prohibited.

Furthermore, in accordance with some embodiments of the present disclosure, the one or more dimensions may be selected from at least one of: (i) category of product of the digital account; (ii) channel that the financial-activity has been operated through; (iii) age of the digital account; (iv) customer age; (v) combination of customer age and age of digital account; and (vi) any other dimension.

Furthermore, in accordance with some embodiments of the present disclosure, the profiling of the aggregated data into profile of each fraudster may be created for each financial-activity, that has been determined by a component of a system of the FI as fraud.

Furthermore, in accordance with some embodiments of the present disclosure, the calculating of the synthetic identity fraud score is by operating the synthetic identity identification module to: (i) receiving the financial-activity operated by a customer of the FI; (ii) extracting one or more dimensions from the received financial-activity; (iii) operating a clustering algorithm to profile the extracted one or more dimensions into a customer profile, peer-group profile and fraudster profile; (iv) comparing each dimension by measuring a distance from the extracted one or more dimensions of the received financial-activity to one or more dimensions in a peer-group profile and one or more dimensions in a fraudster profile; and (v) providing the comparison of dimensions to the ML model for calculating the synthetic identity fraud score.

Furthermore, in accordance with some embodiments of the present disclosure, a computerized-system for identifying synthetic identity fraud operating a financial-activity in a digital financial account, in a Financial Institution (FI) is provided herein.

Furthermore, in accordance with some embodiments of the present disclosure, the computerized-system includes: one or more processors. The one or more processors may be configured to: build a Machine Learning (ML) model by: a. aggregating data of non-monetary activities and monetary-activities operated during a preconfigured period, by one or more dimensions; b. profiling the aggregated data into at least one profile of: (i) customer; (ii) peer-group; and (iii) fraudster; c. operating a clustering algorithm on profiled aggregated data; and d. operating a behavioral analysis to derive a measure of deviation of one behaviour from another; and then implement a synthetic identity identification module the ML model in a FI system to evaluate if a financial-activity operated through each account is a synthetic identity behaviour or a genuine behavior. When a financial-activity that is operated through an account, sending the financial-activity to the synthetic identity identification module and operating the synthetic identity identification module and the ML model to provide a calculated synthetic identity fraud score and when the calculated synthetic identity fraud score is above a preconfigured threshold, the ML model may send the synthetic identity fraud score to an analyst that investigates the financial-activity.

BRIEF DESCRIPTION OF THE DRAWINGS

In order for the present disclosure, to be better understood and for its practical applications to be appreciated, the following Figures are provided and referenced hereafter. It should be noted that the Figures are given as examples only and in no way limit the scope of the disclosure. Like components are denoted by like reference numerals.

FIG. 3A is a schematic flowchart of a computerized-method for identifying synthetic identity fraud operating a financial-activity in a digital financial account, in an FI, in accordance with some embodiments of the present disclosure;

FIG. 3B is a schematic flowchart of an operation of building an ML model, in accordance with some embodiments of the present disclosure;

FIG. 12 is an example of high priority features which was extracted based on clustering of data, in accordance with some embodiments of the present disclosure;

DETAILED DESCRIPTION

Figure 1:
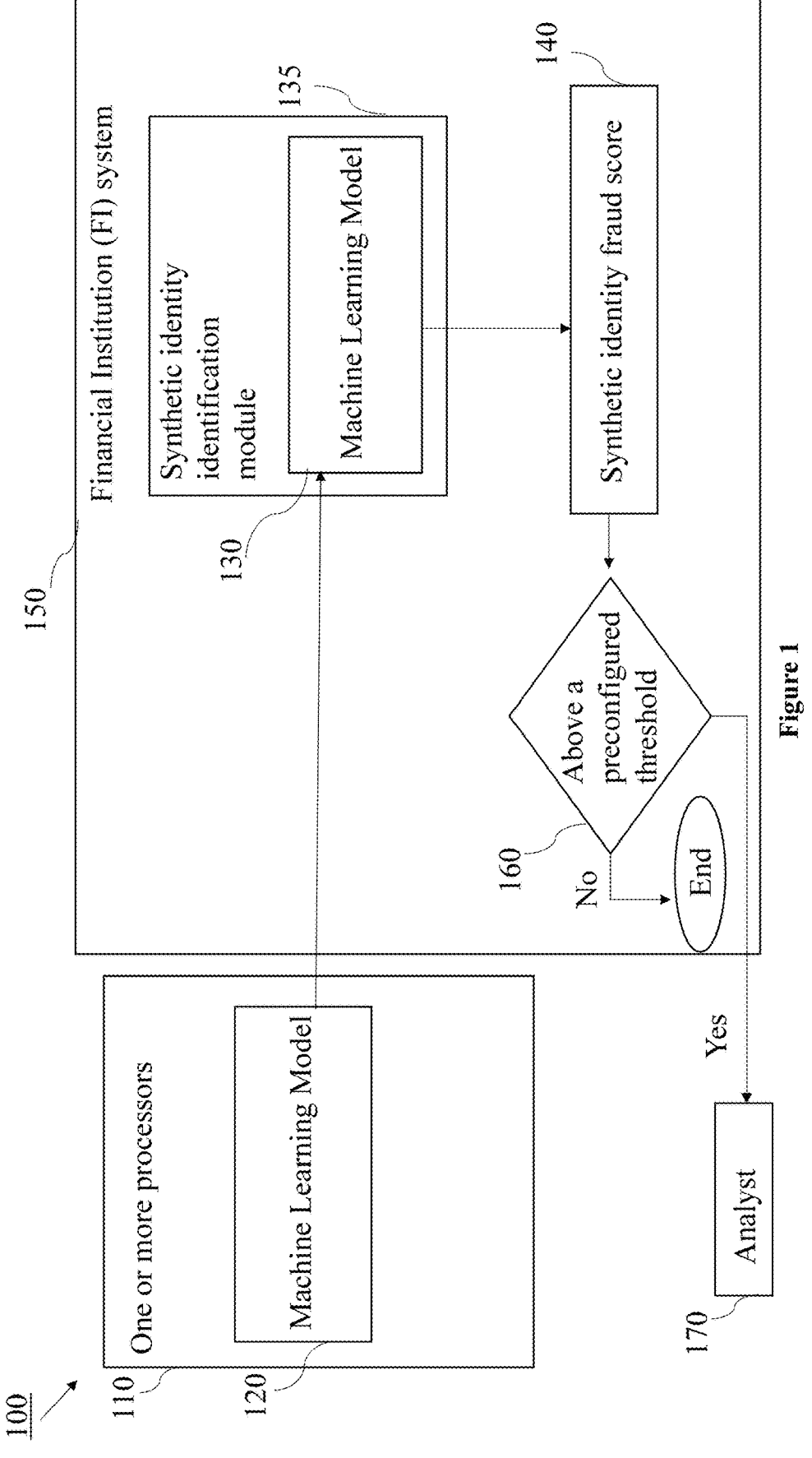
FIG. 1 schematically illustrates a high-level diagram of a computerized-system for identifying synthetic identity fraud operating a financial-activity in a digital financial account, in a Financial Institution (FI), in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence.

Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

Machine Learning (ML) is an application of Artificial Intelligence (AI) that enables systems to learn and improve from experience without being explicitly programmed. ML focuses on developing computer programs that can access data and use it to learn for themselves. The ML process begins with observations or data, such as examples, direct experience or instruction. During the process it looks for patterns in data so it can later make inferences on new data, based on the examples provided.

Fraud detection and prevention is an emerging subfield within Machine Learning (ML) and data science. It is a unique problem since not all anomaly is fraud, but every fraud is anomaly. Consequently, it is not enough to apply traditional methods for anomaly detection to detect fraud. Statistics is a core component of data analytics and ML which helps to analyze and visualize data to find unseen patterns. The mathematical theories behind statistics rely heavily on differential and integral calculus, linear algebra, and probability theory.

The traditional goals of AI research include reasoning, knowledge representation, planning, learning, natural language processing, perception, and the ability to move and manipulate objects. AI researchers have adapted and integrated a wide range of problem-solving techniques, including search and mathematical optimization, formal logic, artificial neural networks, and methods based on statistics, probability and economics.

Multivariate statistics is a subdivision of statistics encompassing the simultaneous observation and analysis of more than one outcome variable. The practical application of multivariate statistics to a particular problem may involve several types of univariate and multivariate analyses in order to understand the relationships between variables and their relevance to the problem being studied.

Synthetic identity fraud is a complex challenge that is growing by the day. Solving it requires effective strategies that examine the core issue of identity legitimacy and the typical outcomes. Synthetic identity theft is the fastest growing type of identity (ID) fraud and its occurrences have surpassed "true-name" identity fraud. An ID Analytics study states it currently accounts for 80-85 percent of all identity fraud. The online banking has made complex fraud like synthetic identity theft easier to carry out and data breaches have made valuable personal information like Social Security Numbers (SSN)s more susceptible to theft and sale on the dark web.

Today banks rely only on vendor data which confirms that some part of the identity is stolen or available in the dark web. With massive data breaches, every single information is available on the dark web. Therefore, identifying these synthetic identities is becoming very difficult and creates a lot of friction on customer onboarding process.

For example, fraudsters get access to PII data, via the dark web, where it is stored after data breaches and sold at a low cost, such as, an SSN costs $1, a driver license $20. The dark web is a hidden collective of internet sites only accessible by a specialized web browser. It is used for keeping internet activity anonymous and private, which can be helpful in both legal and illegal applications.

Fraudsters create synthetic identities to open fraudulent accounts. Once a fraudster has established a new account that cannot be traced back to their origin and have completed control over, they start transacting with the account with the intent of perpetrating fraud for illicit gains or to deposit money from illegal sources. They deposit fraudulent checks, act as money mules to funnel fraudulent money or apply for loans with no intent to repay.

A process of grooming synthetic identity fraud commonly takes multiple months and usually mimics a legitimate behavior. Eventually the fraudsters bust out and make large transactions which create large financial losses to the bank. Accounts which are opened using synthetic identities are groomed over a period, which is called long con. A fraudster builds the synthetic identities once the account is opened. Their activities are similar to any other legitimate account, for example, bill payments, small dollar purchase, take small loans and repay, with the sole intention to increase the available credit line and max out at opportune time.

Sometimes the accounts are dormant with long period of inactivity, with fraudster waiting for the right time to perpetrate fraud. Synthetic identities can evade detection for long period of times, building up credit and reputation before eventually busting out. Fraudsters create an illusion of a real identity, such that FI's are tricked into believing that they are dealing with a legitimate account linked to a legitimate identity.

FI's are at risk being exposed to large fraud losses because of account opened with synthetic identities. It is very difficult to identify a synthetic identity, hence it is one of the fastest-growing modern financial crimes worldwide.

Synthetic identity fraud accounts are responsible for the lion's share of losses associated with new account fraud and it is projected to reach more than US$4.1 billion by 2023, according to Academy of Information Technology and Engineering (AITE). 85% to 95% of applicants which are identified as potential synthetic identities are not flagged by traditional fraud models according to the Federal Reserve Board (the Fed).

Synthetic identity account for 80-85% of Fraud Risk, $6 BN cost of synthetic identity fraud to US financial institutions in 2019. The ID Analytics study states synthetic identity fraud use currently accounts for 80-85 percent of all identity fraud. A recent study found that synthetic identity fraud cost financial institutions $20 billion in 2020 with the average fraudster stealing $81,000 to $97,000 before the fraud was uncovered, according to FiVerity, a company that develops and markets Artificial Intelligence (AI) and ML software solutions that detect new and emerging forms of cyber fraud and deliver actionable, proactive threat intelligence.

Synthetic identity crime rings have proliferated having the multiplier impact on fraud losses. For example, when two fraudsters have two stolen data elements such as an address and an email, a fraudster may combine these elements to create four synthetic identities. Each fraudster may open five accounts per identity which sums up to twenty fraudulent accounts. Assuming of $4,000 average of credit limit per account, there is $80,000 potential loss from two fraudsters ring to the FI. Since there is no real identity in case of synthetic identity fraud, the victims who bear the fraud losses related to fraudulently opened accounts are the FI's themselves.

Therefore, there is a need for a technical solution that accurately monitor newly opened accounts behaviour for suspicious activity depicting a synthetic identity and capturing the behaviour of the newly opened account from the first day, by leveraging each event or activity, i.e., transaction performed by the FI customers, conducted on the account.

There is a need for a method and system for identifying synthetic identity fraud operating a financial-activity in a digital financial account, in a FI.

The term "event" or "activity" as used herein, refers to any action performed on one or more customer accounts in FI. For example, customer logging into an FI banking application, customer enabling service for electronic delivery of monthly account statement, customer initiating a transaction to send money to a payee or customer is receiving money from payor. These actions are happening when ML model is deployed.

FIG. 1 schematically illustrates a high-level diagram of a computerized-system 100 for identifying synthetic identity fraud operating a financial-activity in a digital financial account, in a Financial Institution (FI), in accordance with some embodiments of the present disclosure.

According to some embodiments of the present disclosure, one or more processors 110 may build a Machine Learning (ML) model 120 by aggregating data of non-monetary activities and monetary-activities operated during a preconfigured period, by one or more dimensions, profiling the aggregated data into at least one profile of: (i) customer; (ii) peer-group; and (iii) fraudster, operating a clustering algorithm on profiled aggregated data, and operating a behavioral analysis to derive a measure of deviation of one behavior from another.

According to some embodiments of the present disclosure, the aggregating of data of non-monetary activities and monetary-activities operated during a preconfigured period, by one or more dimensions may be for example, transactions, i.e., actions or financial-activities during a preconfigured period, such as last three months and the attributes may be category of product of the digital account, channel that the financial-activity has been operated through, age of the digital account, customer age.

According to some embodiments of the present disclosure, the profiling of the aggregated data into the profile of customer may be operated for each account of customers of the FI for a preconfigured period, where each customer may have one or more accounts.

According to some embodiments of the present disclosure, the profiling of the aggregated data into the profile of peer-group may be an average of the one or more dismissions of all accounts in the FI.

According to some embodiments of the present disclosure, the profiling of the aggregated data into the profile of each fraudster may be created for each financial-activity, that has been determined as fraud, by a component (not shown) of a system in the FI, such as FI system 150.

According to some embodiments of the present disclosure, the profiling allows to efficiently perform intricate multivariate comparisons between behavioral patterns and get distinctive latent features for augmenting feature space of predictive ML model for fraud, such as ML model 130.

According to some embodiments of the present disclosure, after the ML model 120 is built and trained it may be implemented in an FI system 150 with a synthetic identity identification module 135. The implemented synthetic identity identification module 135 and the ML model 130 may evaluate in real-time if a financial-activity operated through each account is a synthetic identity behaviour or a genuine behavior.

According to some embodiments of the present disclosure, when a financial-activity is operated through an account, in the FI system 150, then the FI system may operate the ML model 130 to provide a calculated synthetic identity fraud score 140. Then, the calculated synthetic identity fraud score may be checked if it is above a preconfigured threshold 160. When the calculated synthetic identity fraud score 140 may be above a preconfigured threshold, the financial activity may be alerted and the synthetic identity fraud score 140 may be sent to an analyst 170 who may investigate the financial activity.

According to some embodiments of the present disclosure, the FI system 150 may block an account, when the synthetic identity fraud score 140 is above the preconfigured threshold. The blocking of the account upon a synthetic fraud score 140 above a preconfigured threshold may be operated automatically by providing the synthetic fraud score 140 to a component (not shown) in the FI system 150. Alternatively, the blocking of the account may be upon a decision of the analyst 170.

According to some embodiments of the present disclosure, the ML model 130 may provide the calculated synthetic fraud score 140 by receiving a comparison of each dimension of extracted one or more dimensions across customer, peer profile and fraudster profile. The calculation of the synthetic fraud score 140 may be operated by an a synthetic identity identification module 135, the module 135 may include: receiving in real-time a financial-activity operated by a user, extracting one or more dimensions from the received financial-activity, operating a clustering algorithm to profile the extracted one or more dimensions into a customer profile, comparing each dimension by measuring a distance from the extracted one or more dimensions of the received financial-activity to one or more dimensions in a peer-group profile and one or more dimensions in a fraudster profile as well as one or more dimensions in customer profile and providing the comparison of dimensions to the ML model 130 to provide the calculated synthetic identity fraud score 140.

According to some embodiments of the present disclosure, when a transaction comes in real-time into an FI system, such as FI system 150 in FIG. 1, it may be received by a module in the system, such as synthetic identity identification module 135 in FIG. 1. The module may extract information that has to be profiled. The Extraction of the information may be predefined, for example if a login event occurs, the date and time it occurred, channel of mobile or web that the login has been conducted from, the session information, browser information, geo location information etc.

Figure 5:
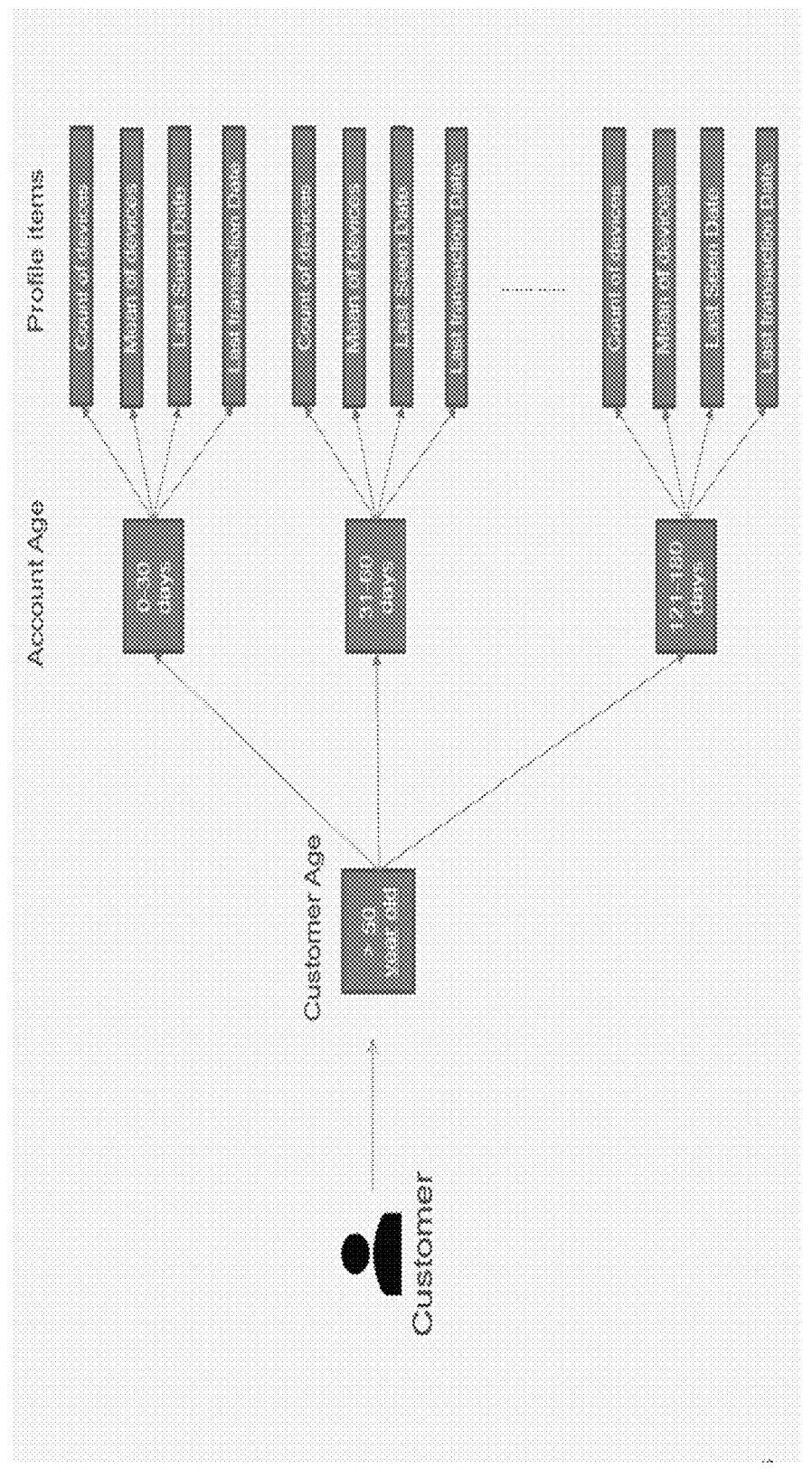
FIG. 5 is an example of a customer profile, in accordance with some embodiments of the present disclosure.
Figure 6:
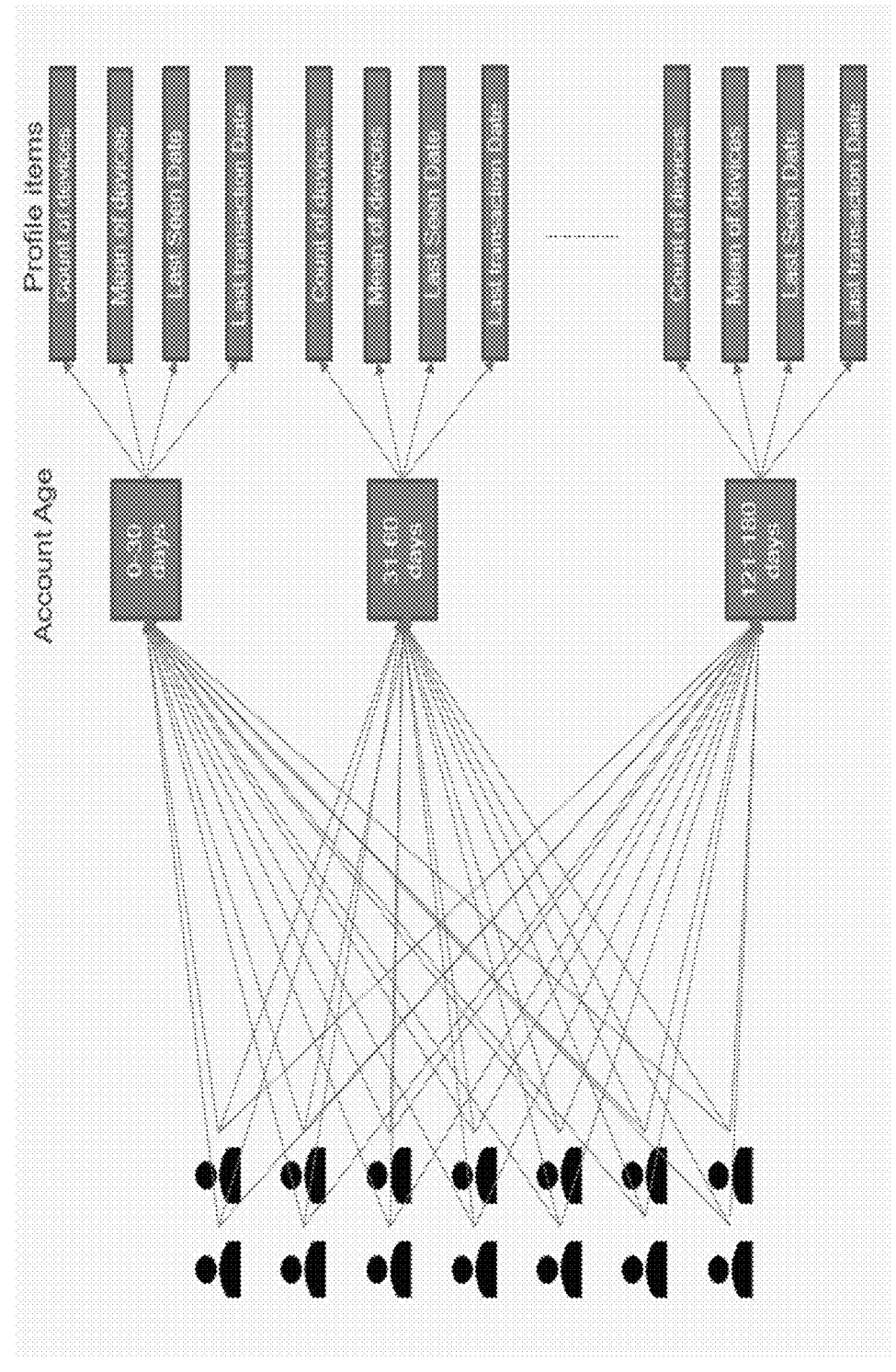
FIG. 6 is an example of peer-group profile, in accordance with some embodiments of the present disclosure.

According to some embodiments of the present disclosure, after the extracted information may be included in a customer profile, as shown in FIG. 5 and in a peer-group profile, as shown in FIG. 6, then, once the persistence of the profile is completed meaning that the profiles are saved within Integration Fraud Management system database] then profiles for the customer, peer-group and fraudster may be extracted by a module, such as synthetic identity identification module 135 in FIG. 1.

According to some embodiments of the present disclosure, a module, such as synthetic identity identification module 135 in FIG. 1, may operate a clustering algorithm to profile the extracted information and use the extracted profiles to calculate features, i.e., dimensions. The calculating of features may include, comparing each feature of the customer with a feature of the fraudster and the peer-group by measuring a distance from the extracted one or more dimensions, i.e., features calculated for the received financial-activity and the one or more dimensions in the peer-group profile and one or more dimensions in the fraudster profile and one or more dimensions in customer profile.

According to some embodiments of the present disclosure, the profiling of the aggregated data into profile of each fraudster may be created for each financial-activity that has been determined as fraud by a component (not shown) of a system, such as FI system 150 in FIG. 1.

According to some embodiments of the present disclosure, the comparison of dimensions may be provided to an ML model, such as ML model 130 in FIG. 1, for calculating a synthetic identity fraud score.

According to some embodiments of the present disclosure, the operated clustering algorithm may be for example, as follows:

given a set of aggregated profiles $(x_1, \ldots, x_n)$, where each profile in the set of profiles, e.g., $x_i$ is a d-dimensional vector, partitioning n aggregated profiles into k≤n clusters $(S_1, \ldots, S_k)$ with the purpose to minimize the within cluster sum of squares. In other words, minimizing the distance, i.e., variance, within each cluster and maximizing the distances between clusters.

$$\underset{S}{\operatorname{argmin}} \sum_{i=1}^{k} \sum_{x \in S_i} \|x - \mu_i\|^2 = \underset{S}{\operatorname{argmin}} \sum_{i=1}^{k} |S_i| \mathrm{Var} S_i$$

where $\mu_i$ is an average distance between all points within a cluster. A point is a dimension of a transaction having one or more features.

According to some embodiments of the present disclosure, by minimizing the variance within the clusters, dense clusters may be created, which means that clustered transactions are very similar. A discrimination or differentiation between clusters may be created by maximizing the distance between the clusters.

According to some embodiments of the present disclosure, it is equivalent to minimize the pairwise squared deviations of aggregated profiles i.e., vectors, in the same cluster:

$$\underset{S}{\operatorname{argmin}} \sum_{i=1}^{k} \frac{1}{|S_i|} \sum_{x,y \in S_i} \|x - y\|^2$$

The formula above represents minimization of pairwise squared deviations of data points in the same cluster, According to some embodiments of the present disclosure, the equivalence may be deduced from the following identity:

$$|S_i| \sum_{x \in S_i} \|x - \mu_i\|^2 = \sum_{x \neq y \in S_i} \|x - y\|^2$$

The formula above represents the notion of constant variance. It is maximizing the sum of squared deviations between data points in different clusters.

According to some embodiments of the present disclosure, since the total variance is constant, this is equivalent to maximizing the sum of squared deviations between points in different clusters, i.e., between-cluster sum of squares.

Given an initial set of k means $$m_1^{(1)}, \ldots, m_k^{(1)},$$

the clustering algorithm may proceed by alternating between two steps:

(i) assignment step: assign each observation to the cluster with the nearest mean that is with the least squared Euclidean distance.

$$S_i^{(t)} = \left\{ x_p : \|x_p - m_i^{(t)}\|^2 \leq \|x_p - m_j^{(t)}\|^2 \ \forall j, 1 \leq j \leq k \right\}$$

where each $x_p$ is assigned to exactly one $S^{(t)}$, even if it could be assigned to two or more of them.

(ii) update step: recalculate means i.e., centroids, for observations assigned to each cluster.

$$m_i^{(t+1)} = \frac{1}{|S_i^{(t)}|} \sum_{x_j \in S_i^{(t)}} x_j$$

Figure 2:
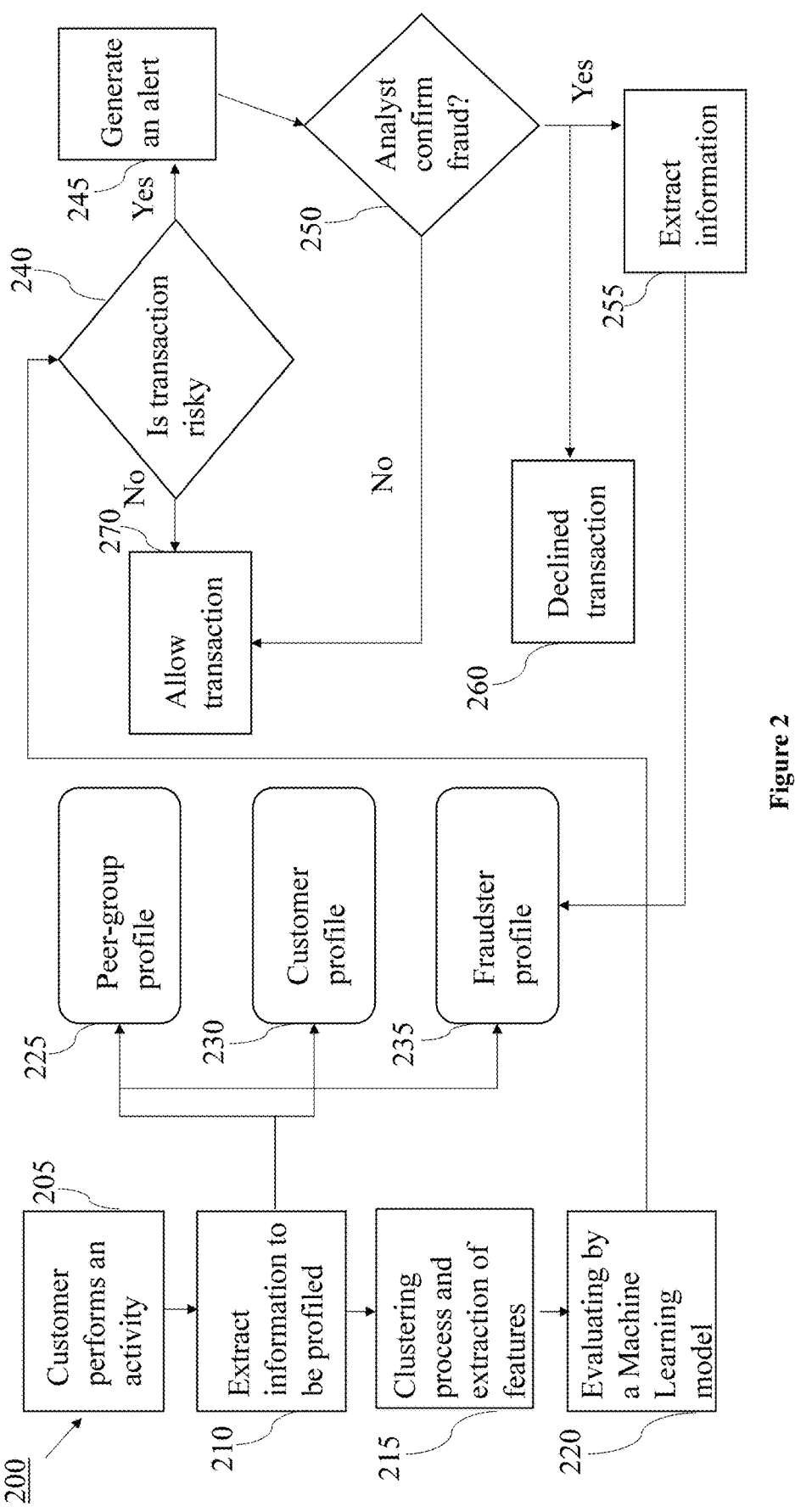
FIG. 2 is a workflow of a computerized-method for identifying synthetic identity fraud operating a financial-activity in a digital financial account, in an FI, in accordance with some embodiments of the present disclosure.

FIG. 2 is a workflow of a computerized-method 200 for identifying synthetic identity fraud operating a financial-activity in a digital financial account, in a Financial Institution (FI), in accordance with some embodiments of the present disclosure.

According to some embodiments of the present disclosure, when a customer performs an activity 205, either a monetary action or a non-monetary action, information may be extracted to be profiled 210 into a customer profile 230, peer-group profile 225 and fraudster profile 235.

According to some embodiments of the present disclosure, then a clustering process and extraction of features 215 may be operated and comparison of dimensions e.g., features, may be sent to an ML model, such as ML model 130 in FIG. 1, for calculating the synthetic identity fraud score.

According to some embodiments of the present disclosure, evaluating by the ML model 220 may be operated to check if a transaction monetary or non-monetary is risky 240. When the transaction is not determined as risky, e.g., synthetic identity fraud score below a preconfigured threshold, the transaction is allowed 270.

According to some embodiments of the present disclosure, when the transaction is determined as risky, e.g., a synthetic identity fraud score above the preconfigured threshold, generate an alert 245 the transaction may be alerted and the score may be sent to an analyst. When the analyst does not confirm fraud, i.e., that the transaction is not risky, then the transaction is allowed 270.

According to some embodiments of the present disclosure, when the analyst confirms fraud, i.e., that the transaction is risky, then information, such as channel through which transaction was initiated, e.g., mobile or web, type of account, account age, transaction amount, transaction type, transaction date time may be extracted 255 and persisted to the fraudster profile 235 and the transaction may be declined 260. The transaction may be declined post which FI may take an action to close the account as well.

FIG. 3A is a schematic flowchart of a computerized-method 300A for identifying synthetic identity fraud operating a financial-activity in a digital financial account, in a Financial Institution (FI), in accordance with some embodiments of the present disclosure.

According to some embodiments of the present disclosure, operation 310a comprising building a Machine Learning (ML) model. The ML model may be a model, such as ML model 120 in FIG. 1.

According to some embodiments of the present disclosure, the building of the ML model may include operations 300B, in FIG. 3B.

According to some embodiments of the present disclosure, operation 320a comprising implementing the ML model and a synthetic identity identification module in an FI system to evaluate if a financial-activity operated through each account is having a synthetic identity behaviour or a genuine behavior. When a financial-activity is operated through an account, sending the financial-activity to the synthetic identity identification module and operating the synthetic identity identification module and the ML model to provide a calculated synthetic identity fraud score and when the calculated synthetic identity fraud score is above a preconfigured threshold, the financial activity is alerted, and synthetic identity fraud score is sent to an analyst to investigate the activity.

According to some embodiments of the present disclosure, the implemented ML model, may be a model, such as ML model 130 in FIG. 1.

FIG. 3B is a schematic flowchart of an operation of building an ML model 300B, in accordance with some embodiments of the present disclosure.

According to some embodiments of the present disclosure, operation 310b comprising aggregating data of non-monetary activities and monetary-activities, that have been operated during a preconfigured period, by one or more dimensions.

According to some embodiments of the present disclosure, operation 320b comprising profiling the aggregated data into at least one profile of: (i) customer; (ii) peer-group; and (iii) fraudster.

According to some embodiments of the present disclosure, operation 330b comprising operating a clustering algorithm on the profiled aggregated data.

According to some embodiments of the present disclosure, operation 340b comprising operating a behavioral analysis to derive a measure of deviation of one behavior from another and calculate a synthetic identity fraud score.

Figure 4:
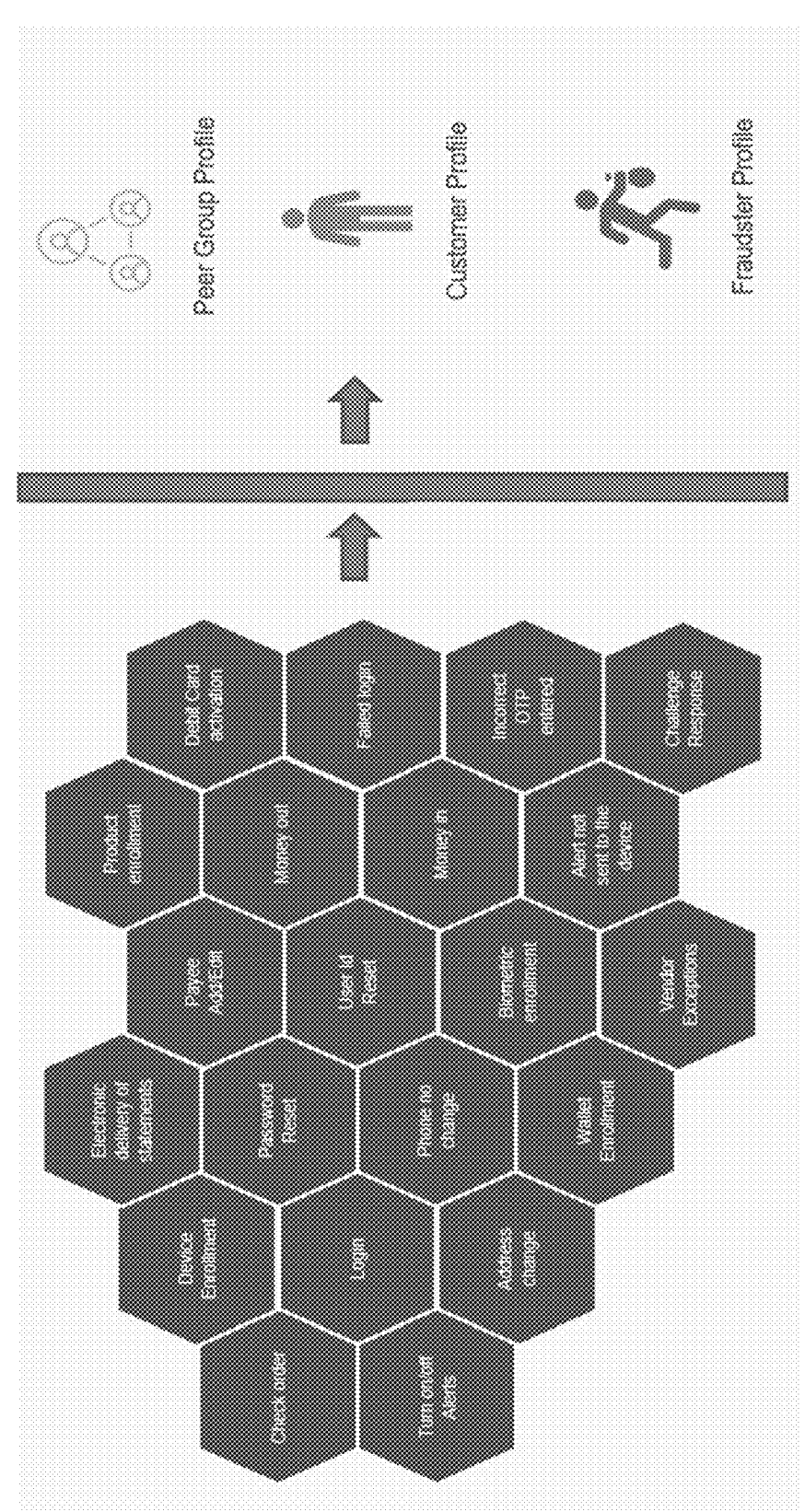
FIG. 4 is an example of events that when a user interacts with an application, in accordance with some embodiments of the present disclosure.

FIG. 4 is an example 400 of events that occur when a user interacts with an application, in accordance with some embodiments of the present disclosure.

According to some embodiments of the present disclosure, example 400 shows events that occur when a user interacts with a banking application, through mobile or web channel. When these events occur, the one or more monetary and non-monetary actions have to be profiled under different profile objects. The monetary and non-monetary actions may be one action or a combination of the following actions: money out, money in, check order, turn on/off alerts, device enrollment, login to the account, address change, electronic delivery of statement, password reset, phone number change, wallet enrollment, payee add/edit, user id reset, biometric enrollment, vendor exceptions, product enrollment, alert not sent to the device, debit card activation, failed login, incorrect OTP entered, challenge response.

According to some embodiments of the present disclosure, for example, the required information may be device enrollment, Login, Money out, Money In, address change, failed login, and debit card activation. These monetary and non-monetary actions may be profiled into three categories (i) customer profile; (ii) peer-group profile; and (iii) fraudster profile.

According to some embodiments of the present disclosure, the customer profile may include only the evaluated customer, i.e., the customer of current interaction for synthetic identity detection in the FI system in production environment. The customer profile may include the following attributes of one or more features: mean, median, standard deviation, count, minimum, maximum, first transaction date and last transaction date of the actions triggered by the customer, as shown for example, in FIG. 5.

FIG. 5 is an example of a customer profile 500, in accordance with some embodiments of the present disclosure.

According to some embodiments of the present disclosure, the customer profile may include for example, items such as the count and the mean of the number of devices that have been used by the customer in the early life cycle of the account. The profile may be setup on the customer id and under the customer id, the account age as a category. When the customer account age is between 0-30 days, then the number of distinct devices may be counted for the customer and persisted into the profile. The data structure may have the customer id as a key and may have the dimension which may be for example, the account age. It may be made more granular by adding the age of the customer. When the customer starts the journey of operating an action on the opened account, the profiles may be built, e.g., how the customer is using devices to operate the banking application. As the age of the account grows, all the devices may be collected in different time periods of the application.

FIG. 6 is an example 600 of a peer-group profile, in accordance with some embodiments of the present disclosure.

According to some embodiments of the present disclosure, peer-group profiles may be collected over time for all the customers who interact with the banking application. For example, for the number of devices across account age, every transaction or action that a customer performs gets aggregated into their respective profile items. In the initial process, once an ML model, such as ML model 130 in FIG. 1, and a synthetic identity identification module, such as synthetic identity identification module 135 in FIG. 1 may be implemented into an Integrated Fraud Management system, such as IFM system 750 in FIG. 7, the peer-group profiles may start getting collected for all the different types of account age groups that the customers belong to peer profile, profiles activity by account age for each customer of the FI.

According to some embodiments of the present disclosure, when an FI system has an overall aggregate of all customers interactions for a certain type of feature, for example, when checking the devices, the average number of devices that banking customers within account age 0-30, use within first 30 days post account is opened may be retrieved or calculated. Example 600 shows a peer-group profile with only account age as a profile dimension. Different customers data flows into the profiles to build a peer-group profile on which the customer may be clustered against, for example, mobile or web transactions, login, monetary or non-monetary transactions, devices used etc.

According to some embodiments of the present disclosure, the fraudster profile may be built in a similar manner to the peer-group profile, but instead of profiling all the customers, profiling only the fraudsters. Fraud is an industry, and every fraud follows a template, therefore capturing fraudsters information such as profiling them may assist in predicting if the customer is operating a fraudulent activity by a synthetic identity fraud. The Fraudster structure may be very similar to the structure of the peer-group profile. The fraud tagging process may identify the fraudsters and also contribute to the building of these profiles. When an investigator investigating an activity alerted for synthetic identity fraud dispositions the alert as fraudulent this process is called fraud tagging post which fraudster profile is updated.

Figure 7:
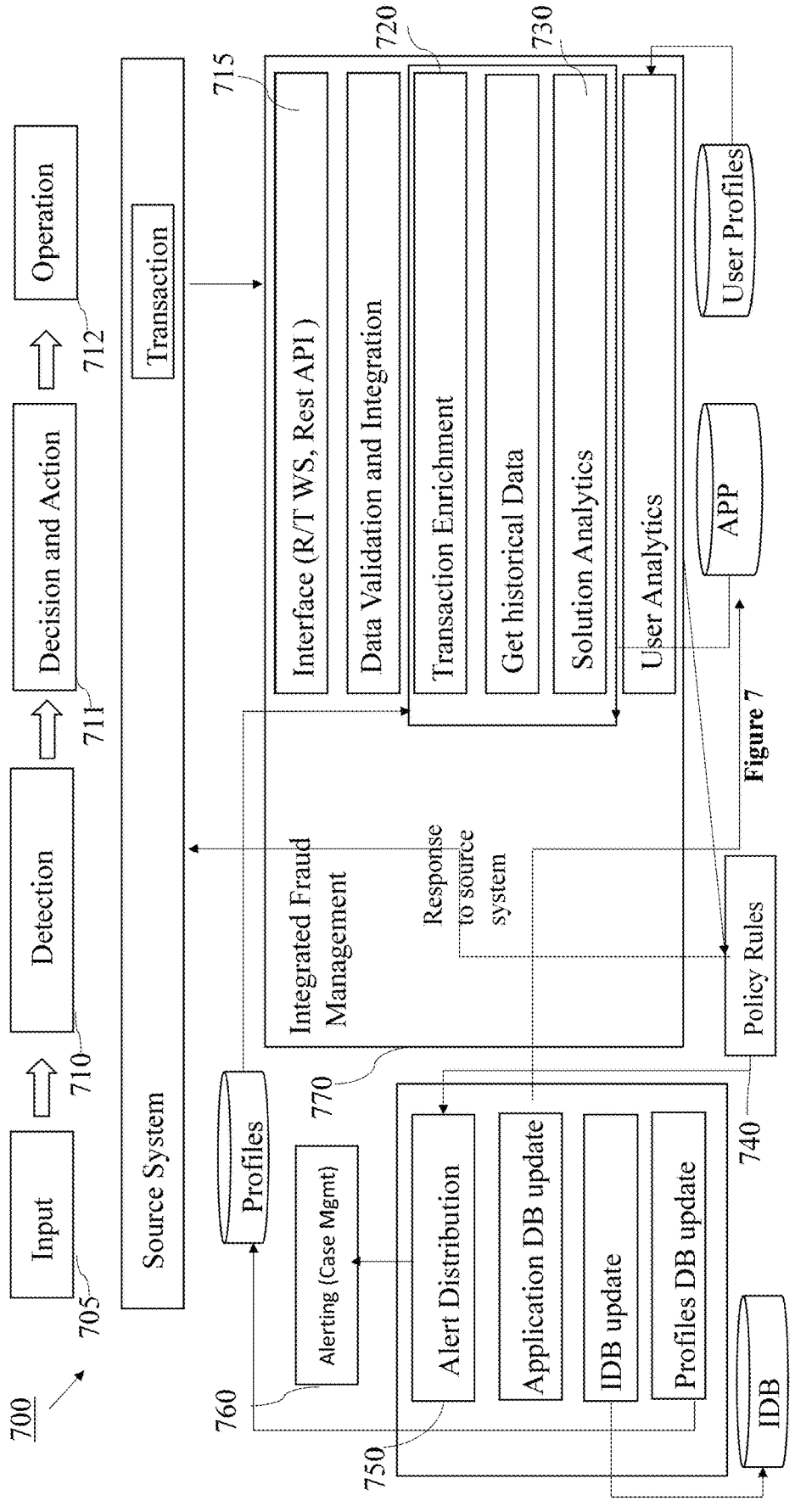
FIG. 7 is a high-level diagram of an Integrated Fraud Management system, in accordance with some embodiments of the present disclosure.

FIG. 7 is a high-level diagram of an Integrated Fraud Management system 700, in accordance with some embodiments of the present disclosure.

Customers open different types of accounts in a bank. When they open the account in the bank and start interacting with the banks web application or mobile application for their banking need, the fraud detection system installed in the bank platform is designed to get all the transactions and evaluate it for fraud risk. A fraud detection system, such as Integrated Fraud Management system 700 may be installed in the bank.

According to some embodiments of the present disclosure, input 705 may be all the events, monetary and non-monetary actions, that the customers perform in the banking platform.

According to some embodiments of the present disclosure, detection 710 represents the component where the actual logic of detecting synthetic identification occurs. When a transaction is fed into the system via different interfaces 715, such as real time or batch, the transactions coming into the fraud detection system may consist of monetary events like paying someone money, depositing a check, receiving money from someone or non-monetary events like adding a payee, turning on alerts etc. Each transaction triggers a detection process.

According to some embodiments of the present disclosure, in a transaction enrichment component 720 the transactions get enriched with information from different internal and external sources.

According to some embodiments of the present disclosure, the solution analytics component 730 may include a module, such as synthetic identification module 135 in FIG. 1 and a model, such as ML model 130 in FIG. 1. Inside the solution analytics component 730 the input data goes in and executes a module, such as the synthetic identification module 135 in FIG. 1 and a model, such as ML model 130 in FIG. 1, and a synthetic identity fraud score may be obtained, the transaction may be alerted and the score may be sent to an analyst to determine if the action has been operated by a synthetic identity or not. Alternatively, the synthetic identity fraud score can be reviewed by the analyst who can block the account.

According to some embodiments of the present disclosure, when a transaction comes into the system, the system may extract the information that needs to be profiled. The extraction of the information may be predefined, for example if a login event has occurred, then the needed information that may be extracted is the date and time it occurred, channel of mobile or web, the device on which it occurred, the session information, browser information, geo location information etc.

According to some embodiments of the present disclosure, the extracted information may be persisted in the customer profile, as shown in FIG. 5, and in the peer-group profile, as shown in FIG. 6. Once the persistence of the profile, i.e., profiles are saved within Integrated Fraud Management system database, may be completed, the profiles for the customer, peer-group and fraudster may be extracted. The extracted profiles may be then used to calculate features. Each feature from customer may be compared with the fraudster and peer, as explained above in the paragraphs related to FIG. 2.

According to some embodiments of the present disclosure, a detection process may be operated in Integrated Fraud Management system 700. The detection process may have four main components:

a. Input (705)—Financial Institutions source systems sends the transaction to Integrated Fraud Management System. Financial Activity of FI's customer is ingested into Integration Fraud Management System as a transaction, through an Interface such as web service \Rest API-715. The data fields provided on transaction are validated for mandatory fields as well as data type validation.

b. Detection (710)—The transaction flows through a detection step. Apart from data fields provided, transaction is enriched (720) with additional data elements. (example—IP address risk insights enrichment, Customer details enrichment). Profiles data having information about behaviour of the customer as well as peer-group and fraudster profile are fetched. Solution analytics (730) calculates the risk score of the transaction. Synthetic identity identification module is part of solution analytics.

c. Decision and Action (711)—Policy Rules (740) are triggered to decision the transaction based upon the risk score calculated by solution analytics (730). If the Policy rules final decision evaluates transaction as risky then Alert is generated for the transaction, through Alert Distribution (750). Source System is sent a response by Policy Rules (740) indicating whether the transaction was alerted or not alerted.

d. Operations (712)—Alert is generated within Risk Case Management system (760). Alert investigator can then investigate the alert.

Figure 8:
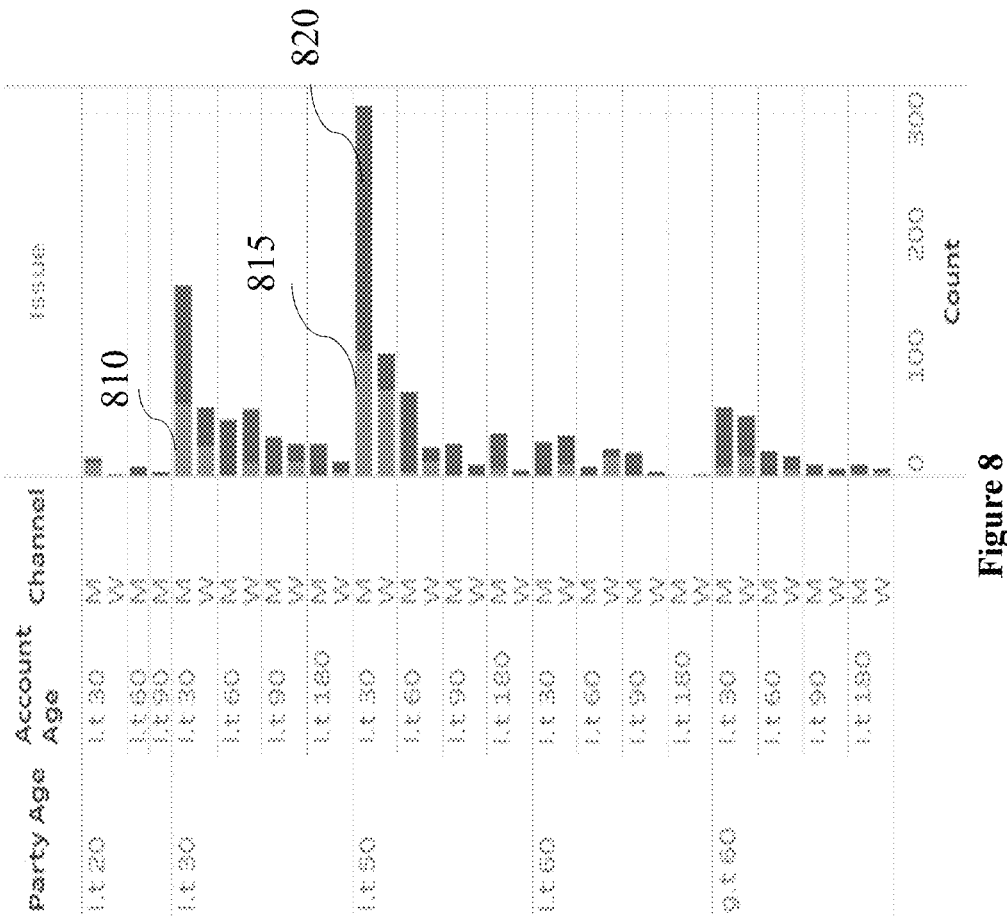
FIG. 8 is a graph showing a lift analysis of a domestic transfer for fraud, in accordance with some embodiments of the present disclosure.

FIG. 8 is a graph 800 showing a lift analysis of a domestic transfer for fraud, in accordance with some embodiments of the present disclosure.

According to some embodiments of the present disclosure, different types of dimensions may be used in calculating the lift of the features. Lift analysis is a measure of the performance of a targeting feature at predicting or classifying synthetic fraud measured against a clean transaction.

According to some embodiments of the present disclosure, the analysis uses customer age, account age and channel. The results of the analysis show that the fraud is mostly among the account age, which is less than 30 days, i.e., newly opened accounts. The light grey area, such as 810 and 815 is the current detection process before the building of the ML model, such as ML model 120 in FIG. 1 and the implementation of the ML model, such as ML model 130 in FIG. 1.

For customer age, i.e., party age, above 50 and account age above 30 days there is a 33% fraud detection rate in current systems. After the implementation of the ML model, such as ML model 130 in FIG. 1 there is approximately 67% synthetic identity fraud which are detected under the same criteria.

Figure 9:
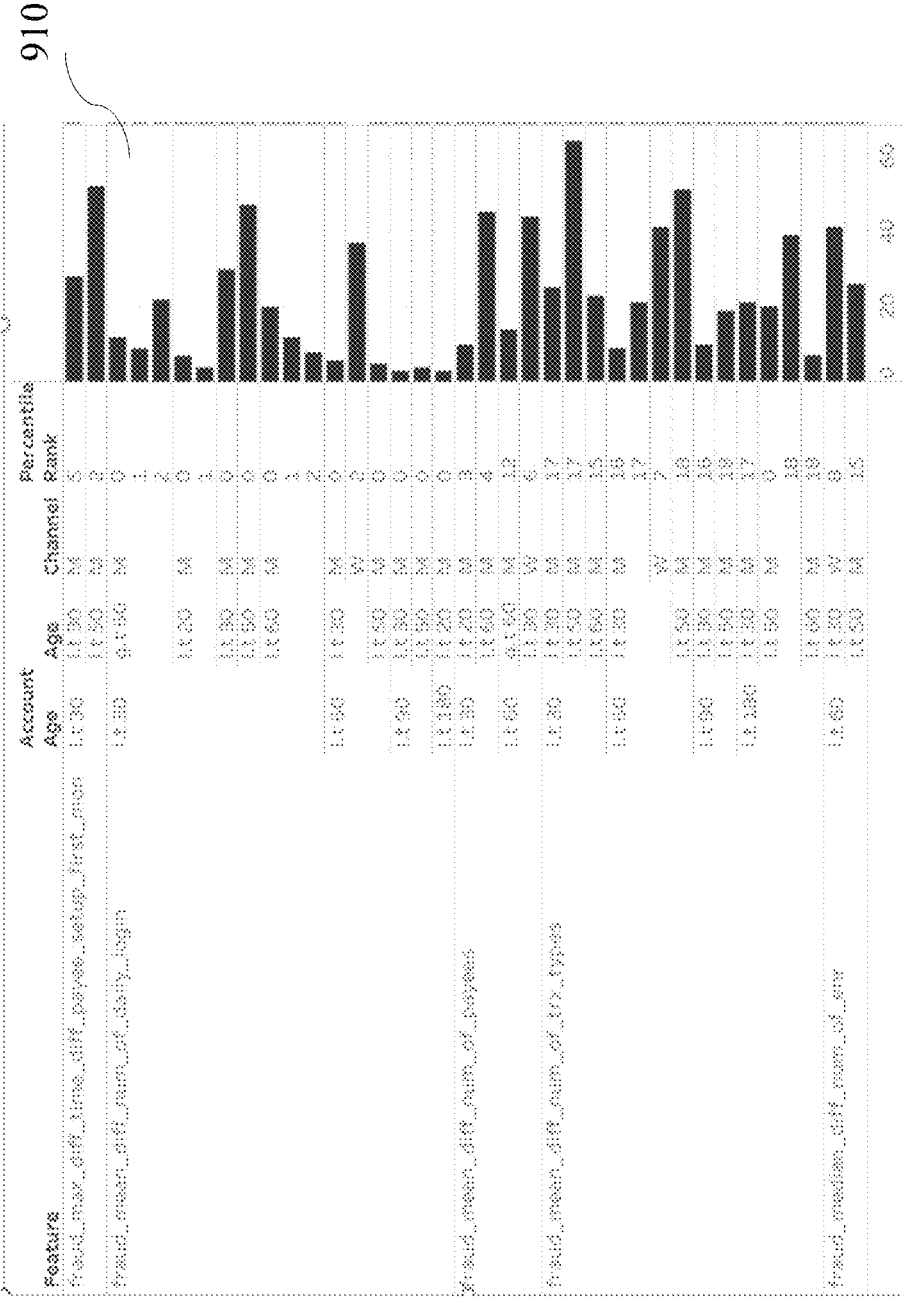
FIG. 9 is a graph showing top five high fraud lift features, in accordance with some embodiments of the present disclosure.

FIG. 9 is a graph 900 showing top five high fraud lift features, in accordance with some embodiments of the present disclosure.

According to some embodiments of the present disclosure, the top five high fraud lift features which are shown in table 900 contributes to capture frauds operated by synthetic identity which are never caught by models in current systems. These are frauds having synthetic behaviors which are caught by using fraud profile clustering, for example, by a system such as computerized-system 100 in FIG. 1 for identifying synthetic identity fraud operating a financial-activity in a digital financial account, in a Financial Institution (FI).

According to some embodiments of the present disclosure, the top five high fraud lift be (i) Fraud_max_diff_time_payee_setup_first_mon; (ii) features may Fraud_mean_diff_num_of_daily_login; (iii) Fraud_mean_diff_num_of_payees; (iv) Fraud_mean_diff_num_of_trx_types; and (v) Fraud_median_diff_num_enr.

According to some embodiments of the present disclosure, Fraud_max_diff_time_payee_setup_first_mon may be a maximum time difference between payee setup and the first monetary transaction to the same payee for customer, peer and fraudster profile for the account age group, customer age group and channel related to financial-activity being risk scored, e.g., synthetic identity fraud score.

According to some embodiments of the present disclosure, Fraud_mean_diff_num_of_daily_login may be an average number of daily logins for customer, peer and fraudster profile for the account age group, customer age group and channel related to financial-activity being risk scored.

According to some embodiments of the present disclosure, Fraud_mean_diff_num_of_payees may be an average number of payees to whom money is sent for customer, peer and fraudster profile for the account age group, customer age group and channel related to financial-activity being risk scored.

According to some embodiments of the present disclosure, Fraud_mean_diff_num_of_trx_types may be an average number of distinct transaction types\activities performed by customer, peer and fraudster profile for the account age group, customer age group and channel related to financial-activity being risk scored.

According to some embodiments of the present disclosure, Fraud_median_diff_num_enr may be an average number of enrollments for customer, peer and fraudster profile for the account age group, customer age group and channel related to financial-activity being risk scored.

According to some embodiments of the present disclosure, column 910 indicates the percentage improvement i.e., lift that is observed for each feature, with regards to impact on accurate risk scoring of each financial activity.

According to some embodiments of the present disclosure, for example, the feature Fraud_max_diff_time_payee_setup_first_mon may relate to a financial activity being risk scored of account age group<30 days, customer age<30 years and channel of financial activity is mobile which may be improved by 30% with regards to risk scoring financial activity. In another example, the feature Fraud_max_diff_time_payee_setup_first_mon may relate to a financial activity being risk scored of account age group<30 days, customer age<50 years and channel of financial activity is mobile and may be improved by 50% with regards to risk scoring financial activity. In yet another example, the feature Fraud_mean_diff_num_of_daily_login may relate to account age group<30 days, customer age<50 years and channel of financial activity is mobile which may be improved by 50% with regards to risk scoring financial activity. In yet another example, the feature Fraud_mean_diff_num_of_daily_login may relate to account age group<60 days, customer age<30 years and channel of financial activity is web which may be improved by 40% with regards to risk scoring financial activity. In yet another example, the feature Fraud_mean_diff_num_of_payees may relate to account age group<30 days, customer age<60 years and channel of financial activity is mobile which may be improved by 40% with regards to risk scoring financial activity. In yet another example, the feature Fraud_mean_diff_num_of_payees may relate to account age group<60 days, customer age<30 years and channel of financial activity is web which may be improved by 40% with regards to risk scoring financial activity. In yet another example, the feature Fraud_mean_diff_num_of_trx_types may relate to account age group<30 days, customer age<50 years and channel of financial activity is mobile which may be improved by 60% with regards to risk scoring financial activity. In yet another example, the feature Fraud_median_diff_num_enr may relate to account age group<60 days, customer age<30 years and channel of financial activity is web which may be improved by 40% with regards to risk scoring financial activity.

Figure 10:
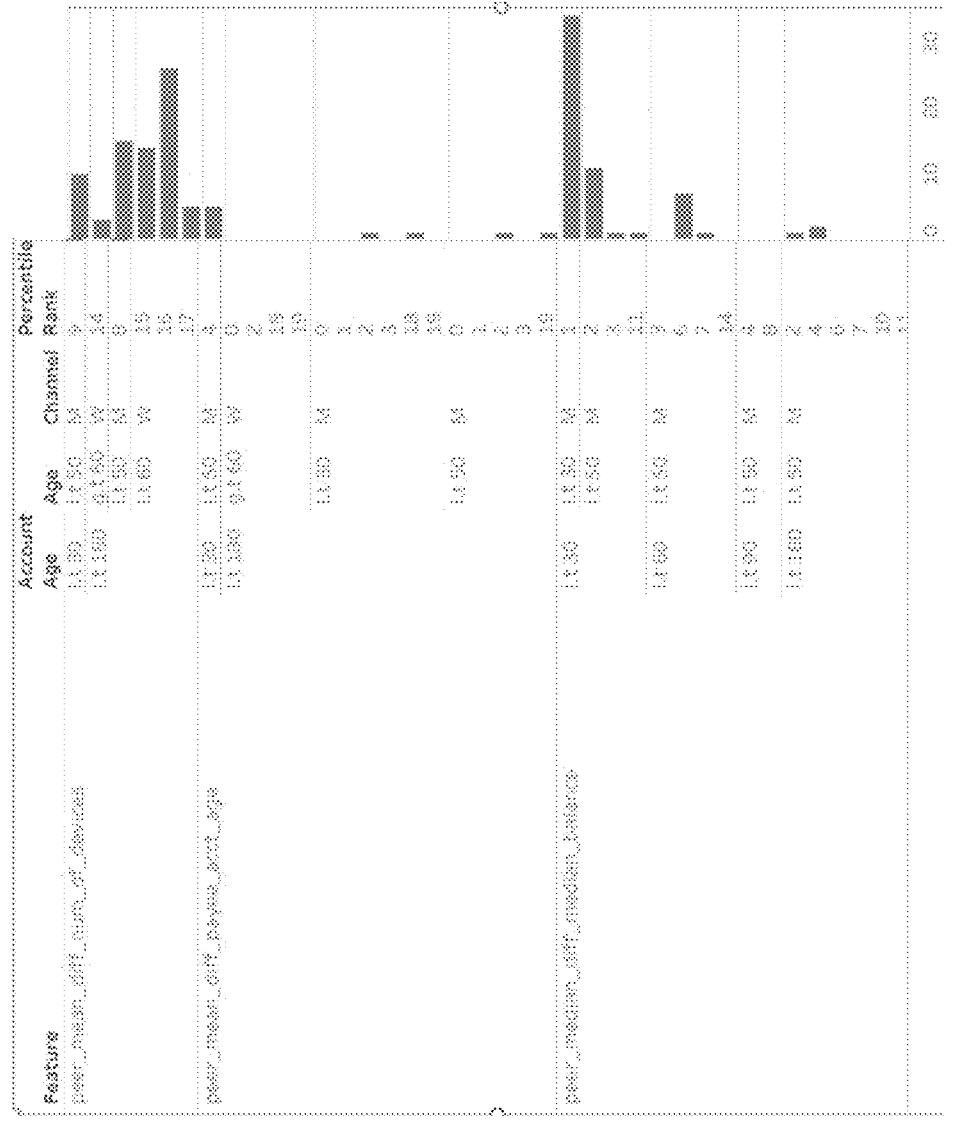
FIG. 10 is a graph showing top peer-group features, in accordance with some embodiments of the present disclosure.

FIG. 10 is a graph 1000 showing top peer-group features, in accordance with some embodiments of the present disclosure.

According to some embodiments of the present disclosure, the top peer-group features show that the clustering of a normal user behavior tends to show that the customer who is getting compared to the peer-group profile is behaving in a non-fraudulent manner. This clustering may lower the risk score of the customer or user.

Figure 11:
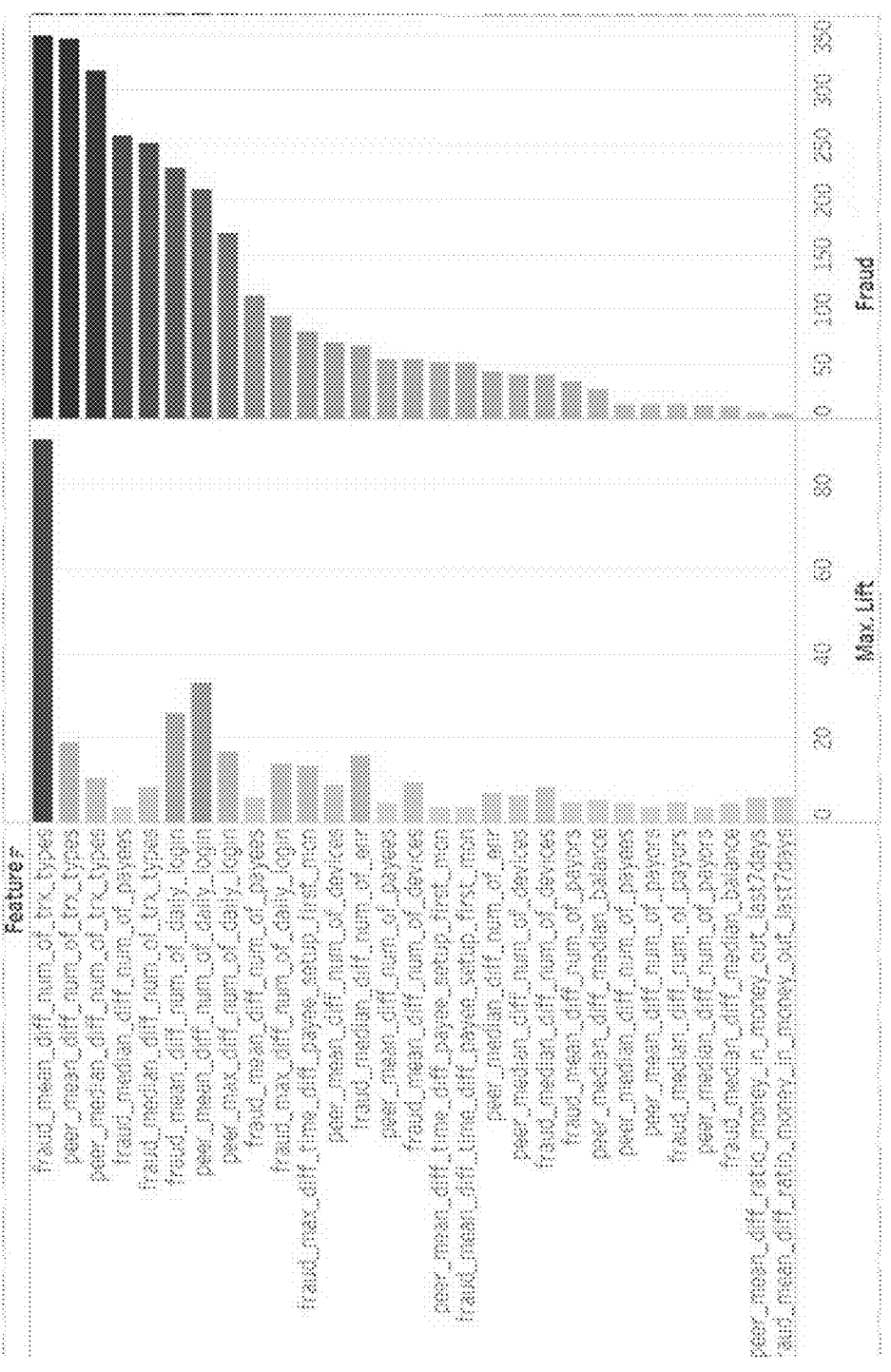
FIG. 11 is a graph showing high lift features sorted by number of frauds they catch during the early account period, in accordance with some embodiments of the present disclosure.

FIG. 11 is a graph 1100 showing high lift features sorted by number of frauds they catch during the early account period, in accordance with some embodiments of the present disclosure.

According to some embodiments of the present disclosure, graph 1100 shows an example of features which may be fed to a Machine Learning (ML) model, such as ML model 120 in FIG. 1, and such as ML model 135. The features, e.g., the one or more dimensions may be selected from at least one of: (i) category of product of the digital account; (ii) channel that the financial-activity has been operated through; (iii) age of the digital account; (iv) customer age; (v) combination of customer age and age of digital account; and (vi) any other dimension.

According to some embodiments of the present disclosure, the ML model may use these features to calculate a synthetic identity fraud score of a financial-activity by receiving the financial-activity and then extracting the one or more dimensions and operating a clustering algorithm to profile the extracted dimensions. Then, comparing each dimension by measuring a distance from the extracted one or more dimensions of the received financial-activity to one or more dimensions in a peer-group profile and one or more dimensions in a fraudster profile as well one or more dimension within customer profile. The comparison results may be provided to the ML model for calculating the synthetic identity fraud score. The comparison may be operated during the feature creation. Using the compared features, we will cluster the behaviour using the ML model.

FIG. 12 is an example 1200 of high priority features which was extracted based on clustering of data, in accordance with some embodiments of the present disclosure.

According to some embodiments of the present disclosure, example 1200 is a table of features, e.g., the one or more dimensions and their category by the impact that it has on the calculation of the synthetic identity fraud score. Table 1200 shows the features which were identified as top performing features for preventing synthetic ID. These features are a result of simulation performed on a clean and fraud dataset.

Figure 13:
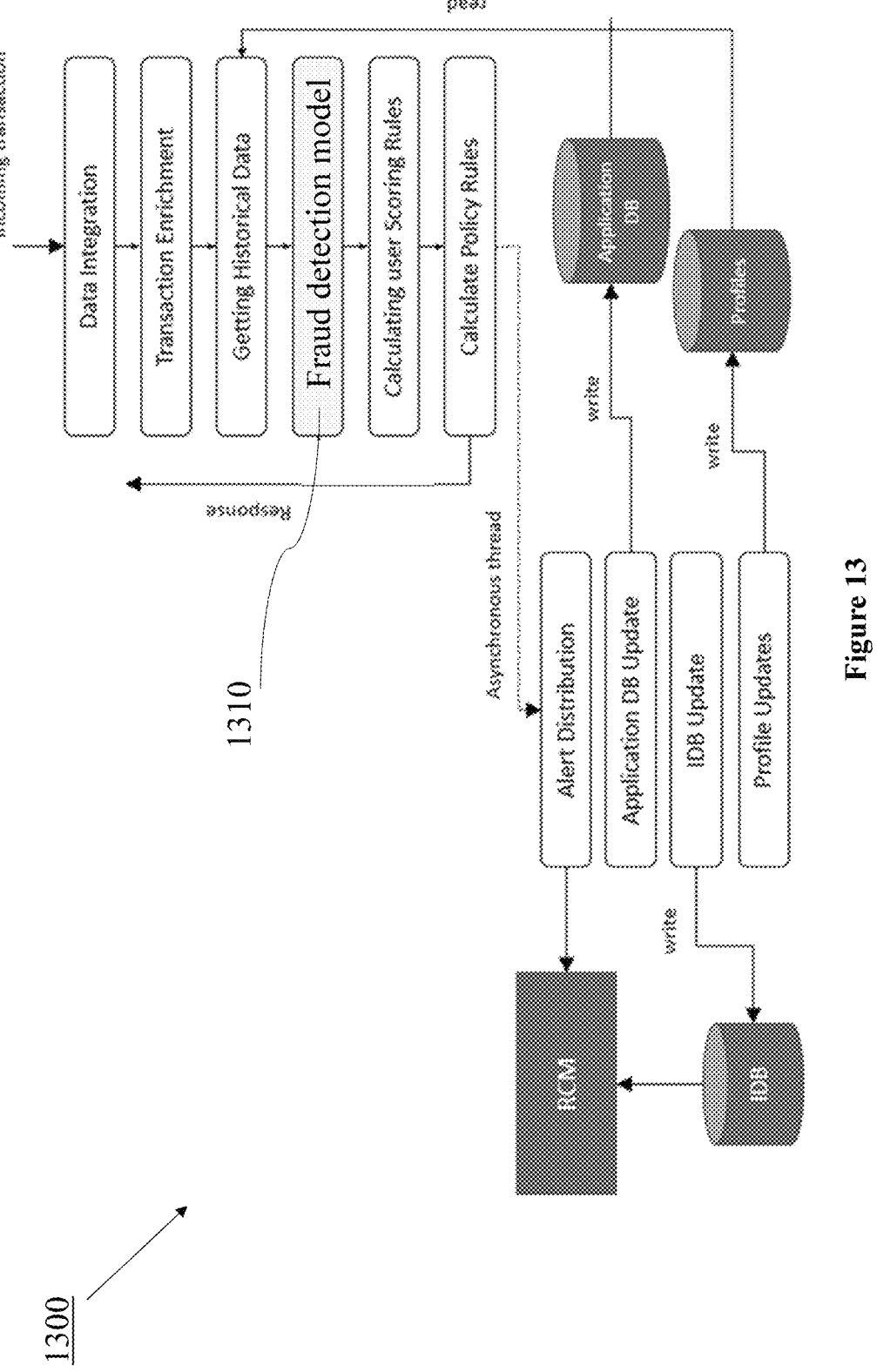
FIG. 13 is a high-level process flow diagram of an Integrated Fraud Management System, in accordance with some embodiments of the present disclosure.

FIG. 13 is a high-level process flow diagram 1300 of an Integrated Fraud Management System, in accordance with some embodiments of the present disclosure.

According to some embodiments of the present disclosure, in a system, such as Fraud Management System 1300 and such as Integrated Fraud Management system 700 in FIG. 7, there are incoming transactions into a data integration component which operates an initial preprocess of the data. Transaction enrichments component operates a preprocess of the transactions. The process of getting historical data synchronizes with new incoming transactions and is followed by a fraud detection model 1310 after which, each transaction gets its risk score. Policy rules are triggered based upon the risk score post which decision is taken to alert or not alert the transaction.

Profiles database contains aggregated financial transactions according to a time period. Profile updates are triggered and synchronized for each incoming transaction. Risk Case Management system is a system that enables alert investigation as well disposition, i.e., marking alert as fraudulent or not fraudulent.

An Investigation DataBase (IDB) system is operating to research transactional data and policy rules resulting for investigation purposes. It analyzes historical cases and alert data. Data can be used by the solution or by external applications that can query the database, for example to produce rule performance reports.

According to some embodiments of the present disclosure, analysts can define calculated variables using a comprehensive context, such as the current transaction, the history of the main entity associated with the transaction, the built-in models result etc. These variables can be used to create new indicative features. The variables can be exported to the detection log, stored in IDB and exposed to users in user analytics contexts.

According to some embodiments of the present disclosure, transactions that satisfy certain criteria may indicate occurrence of events that may be interesting for the analyst. The analyst can define events the system identifies and profiles when processing the transaction. This data can be used to create complementary indicative features. For example, the analyst can define an event that says: amount>$100,000. The system profiles aggregations for all transactions that trigger this event e.g., first time it happened for the transaction party etc.

Figure 14:
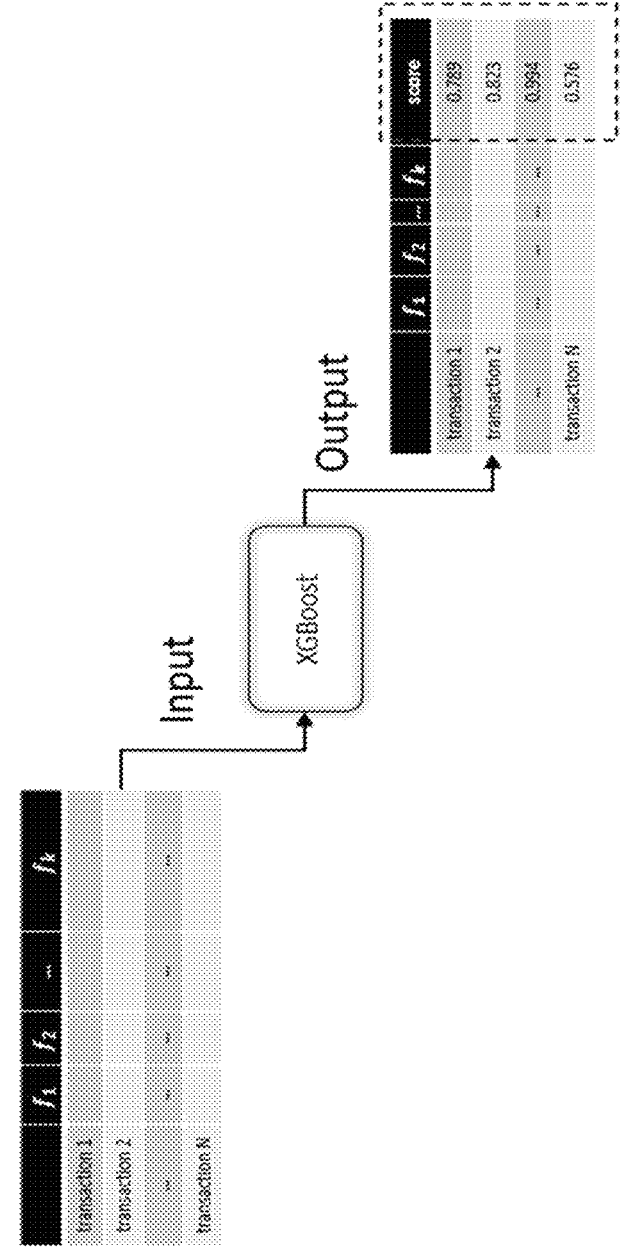
FIG. 14 is an example of input and output of a fraud Machine Learning (ML) mode, in accordance with some embodiments of the present disclosure.

FIG. 14 is an example 1400 of input and output of a fraud Machine Learning (ML) mode, in accordance with some embodiments of the present disclosure.

According to some embodiments of the present disclosure, example 1400 demonstrates the inputs and outputs for the fraud detection ML model, XGBoost. Incoming is a tabular data, consisting of rows e.g., transactions and columns, e.g., attributes per transaction or features. Each attribute or feature may be personal information, deposit amounts, withdrawal amount, details of branches, banks, devices, as well as features based upon customer, peer-group and fraudster profile.

According to some embodiments of the present disclosure, the input to the ML model may be an aggregated tabular data per business activity. There are different types of base activities which consist of two parts: channel and transaction type. The channel activities may be Web, Mobile, Phone, Branch, ATM, POS, API. The transaction types may be domestic, international, ACH, P2P, Enrollment.

According to some embodiments of the present disclosure, typical base activities may be for example, web international transfer, mobile domestic transfer, Automated Teller Machine (ATM) international transfer.

According to some embodiments of the present disclosure, the output of the model may be the same tabular data with one augmented row from the right. This column indicates a risk score i.e., synthetic identity fraud score, such as synthetic identity fraud score 140 in FIG. 1, provided by an ML model, such as ML model 130 in FIG. 1. The value of this regression risk score indicates how probable is that the given transaction is synthetic identity fraud. The higher the risk score, the more probability that the transaction is fraud.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for identifying synthetic identity fraud operating a financial-activity in a digital financial account that was opened within a preconfigured period, in a Financial Institution (FI), said computerized-method comprising:

(i) building a Machine Learning (ML) model by:

a. aggregating data of non-monetary activities and monetary-activities, that have been operated during the preconfigured period, by two or more features, wherein a feature in the two or more features is an age of the digital financial account;

b. profiling the aggregated data into at least one profile of: (1) customer; (2) peer-group; and (3) fraudster;

c. operating a clustering algorithm on the profiled aggregated data;

d. deriving a measure of deviation of one behaviour from another by operating a behavioral analysis and measuring a distance from each feature of the profile of the customer to the feature in the profile of the peer-group and each feature of the profile of the customer to the feature in the fraudster profile, to yield a first comparison between each feature of the profile of the customer to the feature of the profile of the peer-group and a second comparison between each feature of the profile of the customer to the feature of the profile of the fraudster, e. calculating a synthetic identity fraud score, based on the yielded first comparison and second comparison, wherein when the synthetic fraud score is above a preconfigured threshold, it indicates that synthetic identity fraud is operating the financial-activity in the digital financial account; and f. training the ML model;

(ii) implementing the ML model in a synthetic identity identification module that is running in an FI system to evaluate if the financial-activity operated through each digital financial account has one of: synthetic identity behaviour and genuine behavior, (iii) sending the financial-activity to the synthetic identity identification module to operate the ML model to provide a calculated synthetic identity fraud score;

(iv) generating an alert as to the financial-activity when the calculated synthetic identity fraud score is above the preconfigured threshold, and sending the synthetic identity fraud score to an analyst that investigates the financial-activity; and (v) configuring the FI system to block the digital financial account, when the synthetic identity fraud score is above the preconfigured threshold.

2. The computerized-method of claim 1, wherein the profiling of the aggregated data into the profile of customer is for each account of customers of the FI.

3. The computerized-method of claim 1, wherein the profiling of the aggregated data into the profile of peer-group is an average of two or more features of all accounts in the FI, wherein the two or more features are selected from at least one of: (i) category of product of the digital financial account; (ii) channel that the financial-activity has been operated through; (iii) customer age; and (iv) combination of customer age and age of digital financial account; and (v) number of devices used to operate monetary-activities.

4. The computerized-method of claim 1, wherein the profiling of the aggregated data into profile of each fraudster is created for each financial-activity that has been determined by a component of a system of the FI as fraud.

5. The computerized-method of claim 1, wherein the calculating of the synthetic identity fraud score is by operating the synthetic identity identification module to:

(i) receive the financial-activity operated by a customer of the FI;

(ii) extract two or more features from the received financial-activity;

(iii) operate a clustering algorithm to profile the extracted two or more features into a customer profile, peer-group profile and fraudster profile;

(iv) compare each feature by measuring a distance from the extracted one two or more features of the received financial-activity to two or more features in a peer-group profile and two or more features in a fraudster profile and two or more features in a customer profile; and (v) provide the comparison of features to the ML model for calculating the synthetic identity fraud score.

6. A computerized-system for identifying synthetic identity fraud operating a financial-activity in a digital financial account that was opened within a preconfigured period, in a Financial Institution (FI), said computerized-system comprising: one or more processors, said one or more processors are configured to:

(i) build a Machine Learning (ML) model by:

a. aggregating data of non-monetary activities and monetary-activities operated during the preconfigured period, by two or more features, wherein a feature in the two or more features is an age of the digital financial account;

b. profiling the aggregated data into profile of: (1) customer; (2) peer-group; and (3) fraudster, c. operating a clustering algorithm on profiled aggregated data; and d. deriving a measure of deviation of one behaviour from another by operating a behavioral analysis and measuring a distance from each feature of the profile of the customer to the feature in the profile of the peer-group and each feature of the profile of the customer to the feature in the fraudster profile, to yield a first comparison between each feature of the profile of the customer to the feature of the profile of the peer-group and a second comparison between each feature of the profile of the customer to the feature of the profile of the fraudster, e. calculating a synthetic identity fraud score, based on the yielded first comparison and second comparison, wherein when the synthetic fraud score is above a preconfigured threshold, it indicates that synthetic identity fraud is operating the financial-activity in the digital financial account; and f. training the ML model;

(ii) implement the ML model in a synthetic identity identification module that is running in an FI system to evaluate if the financial-activity operated through each digital financial account has one of: synthetic identity behaviour and genuine behavior, (iii) sending the financial-activity to the synthetic identity identification module to operate the ML model to provide a calculated synthetic identity fraud score;

(iv) generate an alert as to the financial-activity when the calculated synthetic identity fraud score is above the preconfigured threshold, and send the synthetic identity fraud score to an analyst that investigates the financial-activity; and (v) configure the FI system to block the digital financial account, when the synthetic identity fraud score is above the preconfigured threshold.

* * * * *